(12) United States Patent
Zhang (10) Patent No.: US 11,331,897 B2
(45) Date of Patent: May 17, 2022

(54) FULL LAMINATION METHOD AND APPARATUS FOR DISPLAY SCREEN

(71) Applicant: SHENZHEN HITEVISION TECHNOLOGY CO., LTD., Shenzhen (CN)

(72) Inventor: Zhizhang Zhang, Shenzhen (CN)

(73) Assignee: SHENZHEN HITEVISION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/285,077

(22) PCT Filed: Dec. 3, 2019

(86) PCT No.: PCT/CN2019/122665
§ 371 (c)(1),
(2) Date: Apr. 13, 2021

(87) PCT Pub. No.: WO2020/078481
PCT Pub. Date: Apr. 23, 2020

(65) Prior Publication Data
US 2021/0387449 A1    Dec. 16, 2021

(30) Foreign Application Priority Data

Oct. 17, 2018  (CN) .......................... 201811210984.0

(51) Int. Cl.
*B32B 41/00*        (2006.01)
*B32B 7/12*         (2006.01)
(Continued)

(52) U.S. Cl.
CPC ............... *B32B 41/00* (2013.01); *B32B 7/12* (2013.01); *B32B 37/0046* (2013.01); *B32B 37/12* (2013.01); *B32B 2457/20* (2013.01)

(58) Field of Classification Search
CPC ....... B32B 7/12; B32B 37/0046; B32B 37/12; B32B 2457/20; B32B 41/00
(Continued)

(56) References Cited

U.S. PATENT DOCUMENTS

2015/0107767 A1*  4/2015  Wadsworth ........... B29C 66/861
                                                          156/324

FOREIGN PATENT DOCUMENTS

CN           104709504 A      6/2015
CN           204979356 U      1/2016
(Continued)

OTHER PUBLICATIONS

International Search Report dated Feb. 21, 2020 for PCT application No. PCT/CN2019/122665.

*Primary Examiner* — Michael N Orlando
*Assistant Examiner* — Joshel Rivera (57) ABSTRACT

The application relates to a full lamination method and apparatus for a display screen, wherein the full lamination method for a display screen comprises: arranging a first layer body horizontally; coating liquid glue on an upper surface of the first layer body; placing a second layer body over the first layer body at a preset inclination with a lower surface of the second layer body contacting with an initially affixed end of the first layer body; controlling the second layer body to swing in a direction approaching the first layer body according to a speed curve gradually reducing over time, so that the second layer body is affixed to the first layer body at a preset speed.

12 Claims, 5 Drawing Sheets

(51) Int. Cl.
*B32B 37/00* (2006.01)
*B32B 37/12* (2006.01)

(58) Field of Classification Search
USPC .................... 156/60, 64, 350, 351, 378, 379
See application file for complete search history.

(56) References Cited

FOREIGN PATENT DOCUMENTS

| | | |
|---|---|---|
| CN | 105775221 A | 7/2016 |
| CN | 205601334 U | 9/2016 |
| CN | 107481958 A | 12/2017 |
| CN | 107498972 A | 12/2017 |
| CN | 108116029 A | 6/2018 |

\* cited by examiner

FULL LAMINATION METHOD AND APPARATUS FOR DISPLAY SCREEN

CROSS REFERENCE TO RELATED APPLICATION

This application is a National Stage of International Application No. PCT/CN2019/122665, filed on Dec. 3, 2019, which claims priority to Chinese Patent Application No. 201811210984.0 entitled "FULL LAMINATION METHOD AND APPARATUS FOR DISPLAY SCREEN" and filed on Oct. 17, 2018, both of which are hereby incorporated by reference in their entireties.

TECHNICAL FIELD

The embodiments of the application relate to the technical field of manufacturing a display screen, and in particular, to a full lamination method and apparatus for a display screen.

BACKGROUND

The production of a display screen typically involves affixing of two adjacent layer bodies, for example, during affixing a glass protective layer to an OC (open cell). In addition, in order to ensure a good display effect, the two layer bodies are mostly affixed together by using a full lamination process.

The specific procedure of the full lamination process is as follows: glue, such as solid or liquid transparent optical glue, is coated on one surface of one of the layer bodies, and then another layer body is affixed on the glue-coated side of the layer body. In such a way, the two layer bodies are fitted fully closely together without any gap or air layer.

However, in actual production, the full lamination process mostly adopts the solid glue to affix the two layer bodies and uses a roller to press the two layers together, and when the liquid glue is adopt, the flexible deformation and shaking of the upper layer body itself will result in the undesirable phenomenon such as bubbles in the affixing process.

SUMMARY

The technical problem to be solved by the embodiments of the application is to provide a full lamination apparatus for a display screen in view of the above defects in the prior art, so as to overcome the undesirable defect that bubbles easily occur in the existing display screen production mode.

The display screen comprises a first layer body and a second layer body affixed viscidly to the first layer body, and the technical solution employed by the application to solve the technical problem thereof is to provide a full lamination method for the display screen, comprising:

Step 100: arranging a first layer body horizontally;

Step 120: coating liquid glue on an upper surface of the first layer body;

Step 140: placing a second layer body over the first layer body at a preset inclination with an lower surface of the second layer body contacting with an initially affixed end of the first layer body;

Step 160: controlling the second layer body to swing in a direction approaching the first layer body according to a speed curve gradually reducing over time, so that the second layer body is affixed to the first layer body at a preset speed; wherein the preset inclination is $\alpha_0$, an initial angular speed of swing is $\omega_0$, an overall affixed length of the second layer body is L, the preset speed is Vt, and they satisfy the following relational expression:

$$\alpha_0 \geq 9°;$$

$$0.3°/s \leq \omega_0 \leq 0.4°/s;$$

$Vt \in [V-V*5\%, V+V*5\%]$, wherein $V$ is a reference speed and satisfies:

$$V = \frac{\omega_0}{\alpha_0} L.$$

In some embodiments, the speed curve reduces in a step-like manner.

In some embodiments, the speed curve comprises three speed stages, the initial speeds of which are $V_1$, $V_2$ and $V_3$ in sequence, where $V_1=0.3°/s$, $V_2=0.15°/s$ and $V_3=0.1°/s$; and the second layer body is swung from 9° to 5° at $V_1$, from 5° to 2° at $V_2$, and then from 2° to 0° at $V_3$.

In some embodiments, the reference speed V=30 mm/s.

An embodiment of the application further provides a full lamination apparatus for a display screen, comprising:

a chassis;

an affixing platform fixed relative to the chassis, the affixing platform having a table top arranged upward and used for the first layer body to be placed flat on; a lifting support mechanism mounted on the chassis, the lifting support mechanism having a support frame which can be lifted and lowered, the support frame supporting the second layer body upward; and a controller for controlling, by controlling the lifting support mechanism, the second layer body to swing in a direction approaching the first layer body according to a speed curve gradually reducing over time, so that the second layer body is affixed to the first layer body at a preset speed.

In some embodiments, the support frame comprises a support block having an upward support surface for abutting against the bottom surface of the second layer body.

In some embodiments, the support block further has a first positioning surface facing a center of the second layer body, which is used to abut against an edge of the second layer body.

In some embodiments, the support frame further comprises a base and a cross bar, wherein the base extends from bottom to top, and the cross bar extends from the upper end of the base to the center of the second layer.

The supporting block is pivotally connected at an end of the cross bar away from the base, and the pivot axis of the support block is perpendicular to the attaching and feeding direction of the second layer body.

In some embodiment, that lift support mechanism further comprises a drive device, and the full-fit apparatus further comprises a control box electrically connected to the drive device to control the lifting and lowering of the support frame.

In some embodiments, the table top has a first axis extending in the lamination feed direction of the second layer body and passing through the center of the table top.

There are provided with at least two lifting support mechanisms, which are located at a periphery of the table top and at opposite sides of the first axis respectively.

In some embodiments, the full lamination apparatus for a display screen further comprises a positioning means fixed on the chassis, which has a second positioning surface facing a center of the table top. At the beginning of affixing, the second positioning surface abuts against an end of the first layer body superimposed on the second layer body in an affixing feed direction of the second layer body.

In some embodiments, the table top has a first axis extending in the affixing feed direction of the second layer body and passing through the center of the table top.

The second layer body has a second axis, the projection of which on the table top is perpendicular to the first axis;

There are provided with at least two lifting support mechanisms, which are located at a periphery of the table top and at opposite sides of the first axis respectively;

The support frame of each lifting support mechanism comprises a support block having a first positioning surface facing the center of the second layer body, which is used to abut against a surface of the second layer body. The first positioning surfaces of the two support blocks are arranged opposite in the extending direction of the second axis.

In some embodiment, the affixing platform is fixed to the chassis in a horizontally detachable manner.

In some embodiments, the full lamination apparatus for a display screen further comprises an automatic fixing clip for automatically locking and fixing the affixing platform when the affixing platform moves to the preset position of the chassis.

The beneficial effect of the application is that, by controlling the second layer body to swing toward the first layer body from an inclined position according to a speed curve gradually reducing over time, it is possible to ensure the lateral uniformity of affixing angle for the second layer body which is affixed continuously every moment in the lateral direction. On the other hand, in the affixing direction, the second layer body is affixed to the first layer body at a preset speed, that is, the affixed area per unit time is relatively uniform, so that the generation of bubbles is reduced and the yield of affixing is ensured.

BRIEF DESCRIPTION OF THE DRAWINGS

The application will be further illustrated in detail below in combination with the drawings and embodiments, in which.

LIST OF REFERENCES 1 chassis; 311 support surface; 5 positioning means;
2 affixing platform; 312 first positioning surface; 6 automatic fixing clip;
3 lifting support mechanism; 320 base; 201 first layer body;
31 support frame; 330 cross bar; 202 second layer body;
310 support block; 4 control box.

DETAILED DESCRIPTION

The technical solutions in the embodiments of the application will be described clearly and fully below with reference to the accompanying drawings. It is obvious that the described embodiments are only a part of the embodiments, rather than all of the embodiments. Based on the embodiments of the application, all other embodiments obtained by a person of ordinary skill in the art without creative efforts shall fall within the protection scope of the application.

If there is a directional indication (such as upper, lower, left, right, front, rear) involved in the embodiments of the application, such directional indication is only intended to explain the relative positional relationship, movement and the like between various components at a certain posture (as shown in the drawings). If the certain posture is changed, the directional indication will also be changed accordingly.

In addition, if there is a description relating to "first," "second," and the like in the embodiments of the application, the description of "first", "second" and the like is only for the purpose of illustration, and shall not be interpreted to indicate or imply the relative importance thereof or implicitly specify the number of the indicated technical feature. Thereby a feature defined with "first", "second" may comprise at least one of the features, either explicitly or implicitly. In addition, the technical solutions of various embodiments may be combined with each other, on the premise that such combination can be realized by a person of ordinary skill in the art. If the combination of technical solutions is contradictory or cannot be realized, it shall be considered that such combination neither exists nor falls within the protection scope of the application.

Figure 1:
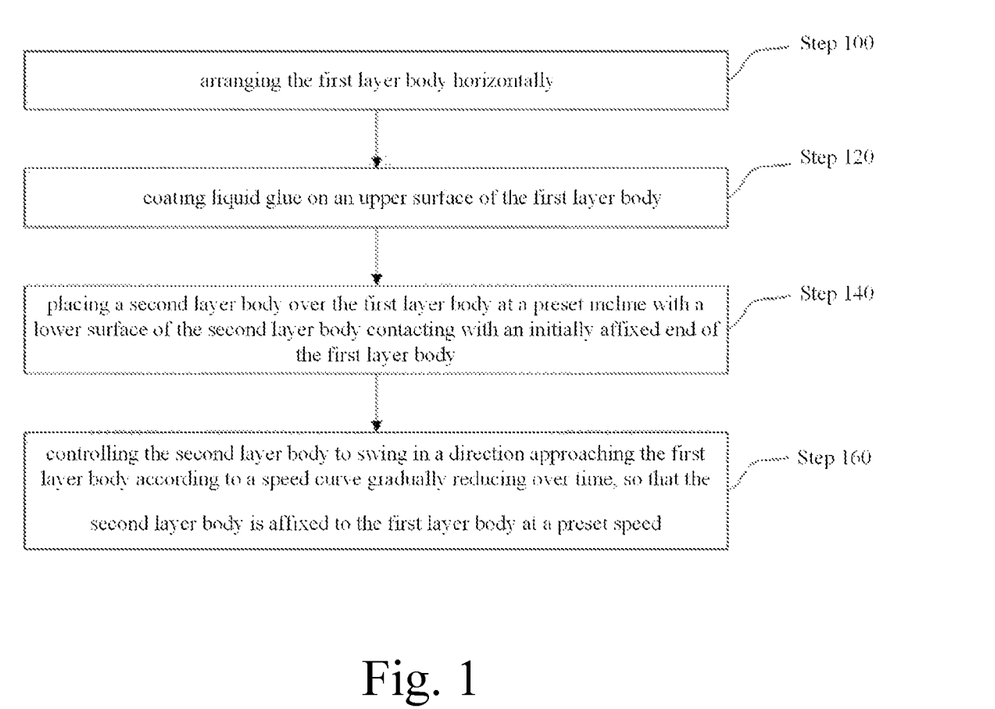
FIG. 1 is a schematic flow chart of an embodiment of the full lamination method for a display screen of the application.

Referring to FIG. 1, an embodiment of the application provides a full lamination method for a display screen, which comprises:

Step 100: arranging a first layer body horizontally;

The purpose of arranging the first layer body horizontally is to avoid excessive flow of liquid glue or uneven thickness after subsequent application of the liquid glue. In order to arrange the first layer body horizontally, it is possible to place the first layer body horizontally on an upward table top and position the first layer body by the device limiting or adsorbing the device.

Step 120: coating liquid glue on an upper surface of the first layer body;

The liquid glue has certain flowability, and the second layer body and the first layer body upon affixing can force the liquid glue to flow. It is possible to avoid bubbles formed in the glue by controlling the affixing speed.

Step 140: placing a second layer body over the first layer body at a preset inclination with an lower surface of the second layer body contacting with an initially affixed end of the first layer body;

It is possible to place the second layer body above the first layer body at a preset inclination by holding up or adsorbing, and optionally, a lower surface of the second layer body is initially in line contact with the initially affixed end of the first layer body. Specifically, in order to facilitate the adjustment and positioning of the second layer body, the second layer body can be provided with a length longer than that of the first layer body, so that the initially affixed end of the second layer body is protrusively arranged with respect to the initially affixed end of the first layer body.

Step 160: controlling the second layer body to swing in a direction approaching the first layer body according to a speed curve gradually reducing over time, so that the second layer body is affixed to the first layer body at a preset speed;

wherein the preset inclination is $\alpha_0$, an initial angular speed of swing is $\omega_0$, an overall affixed length of the second layer body is L, the preset speed is Vt, and they satisfy the following relational expression:

$\alpha_0 \geq 9°$;

$0.3°/s \leq \omega_0 \leq 0.4°/s$;

$Vt \in [V-V*5\%, V+V*5\%]$, wherein $V$ is a reference speed, and satisfies:

$$V = \frac{\omega_0}{\alpha_0} L.$$

In this embodiment, the speed curve may be a ramp-shaped drop or a convex curve or concave curve drop, provided that the preset speed Vt falls within the interval of [V−V*5%, V+V*5%]. It should be noted that the unit for $\omega_0$ above is a degree per second. For example, if it is swung at an angular speed of 0.3 degree per second, for example, it can be rotated by 3 degrees every 10 seconds. Alternatively, the reference speed V=30 mm/s.

It can be appreciated that, if the preset inclination is too large, it is easy to cause the second layer body to experience an idle stroke during the swinging process, that is, the second layer body is not affixed to the first layer body during the swinging process, and if the preset inclination is too small, it is easy to cause the second layer body to form an excessive affixed area with the first layer body at the beginning, thereby generating bubbles. Therefore, the preset inclination $\alpha_0 \geq 9°$ can ensure that the second layer body is affixed to the first layer body at the beginning of affixing with bubbles being generated.

After the preset inclination is determined, the initial swing angular speed decides the magnitude of the reference speed, and the bubbles resulting from the large affixed area per unit time can be avoided by controlling the initial swing angular speed $\omega_0$ within a reasonable range. If the affixing speed is controlled within the range of [V−V*5%, V+V*15%], it can be ensured that no bubbles will be generated in the whole affixing process.

The display screen comprises a first layer body and a second layer body affixed viscidly to the first layer body surface. For example, the first layer body is a glass protective layer, and the second layer body is an OC (open cell); or the first layer body is a touch screen, and the second layer is an OC (open cell).

The beneficial effect of the embodiments of the application is that, by controlling the second layer body to swing toward the first layer body from an inclined position according to a speed curve gradually reducing over time, it is possible to ensure the lateral uniformity of affixing angle for the second layer body which is affixed continuously every moment in the lateral direction. On the other hand, in the affixing direction, the second layer body is affixed to the first layer body at a preset speed, that is, the affixed area per unit time is relatively uniform, so that the generation of bubbles is reduced and the yield of affixing is ensured.

Alternatively, the speed curve reduces in a step-like manner. In this way, frequent adjustment of the swing speed can be avoided. Optionally, the speed curve comprises three speed stages, the initial speeds of which are $V_1$, $V_2$ and $V_3$ in sequence, where $V_1=0.3°/s$, $V_2=0.15°/s$ and $V_3=0.1°/s$; and the second layer body is swung from 9° to 5° at $V_1$, from 5° to 2° at $V_2$, and then from 2° to 0° at $V_3$.

Figure 2:
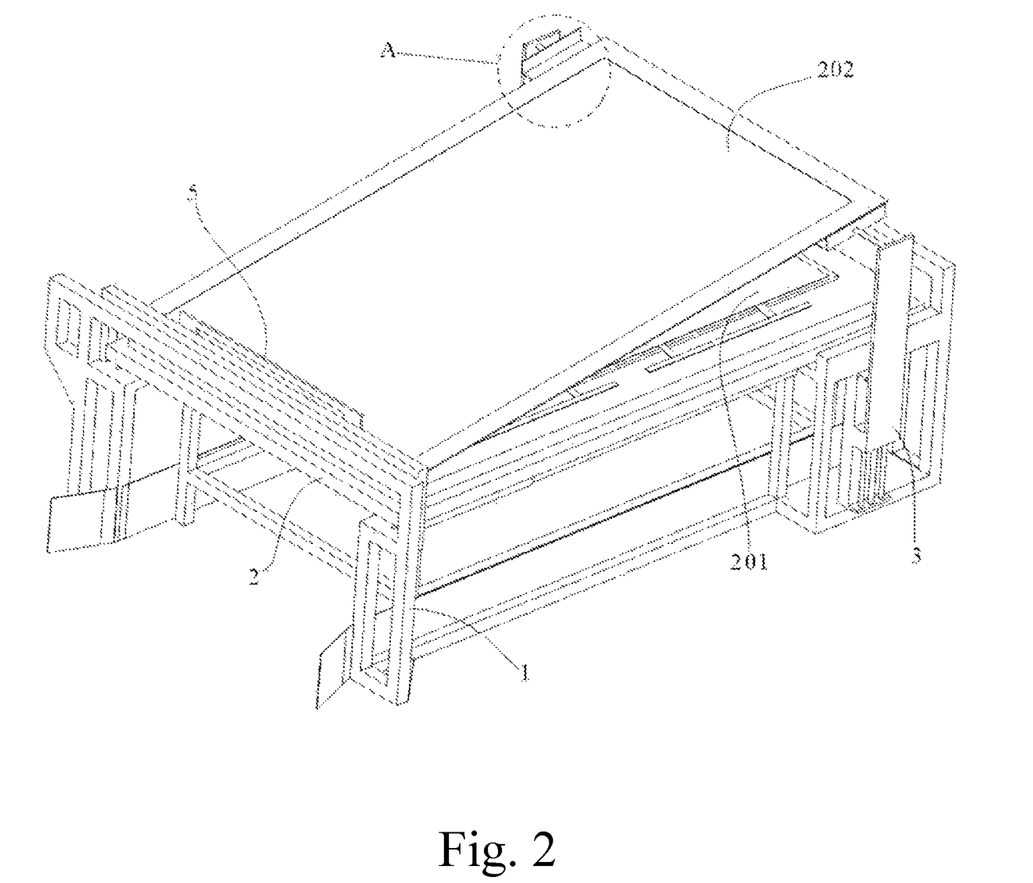
FIG. 2 is a schematic structural view of an embodiment of the full lamination apparatus for a display screen of the application.
Figure 3:
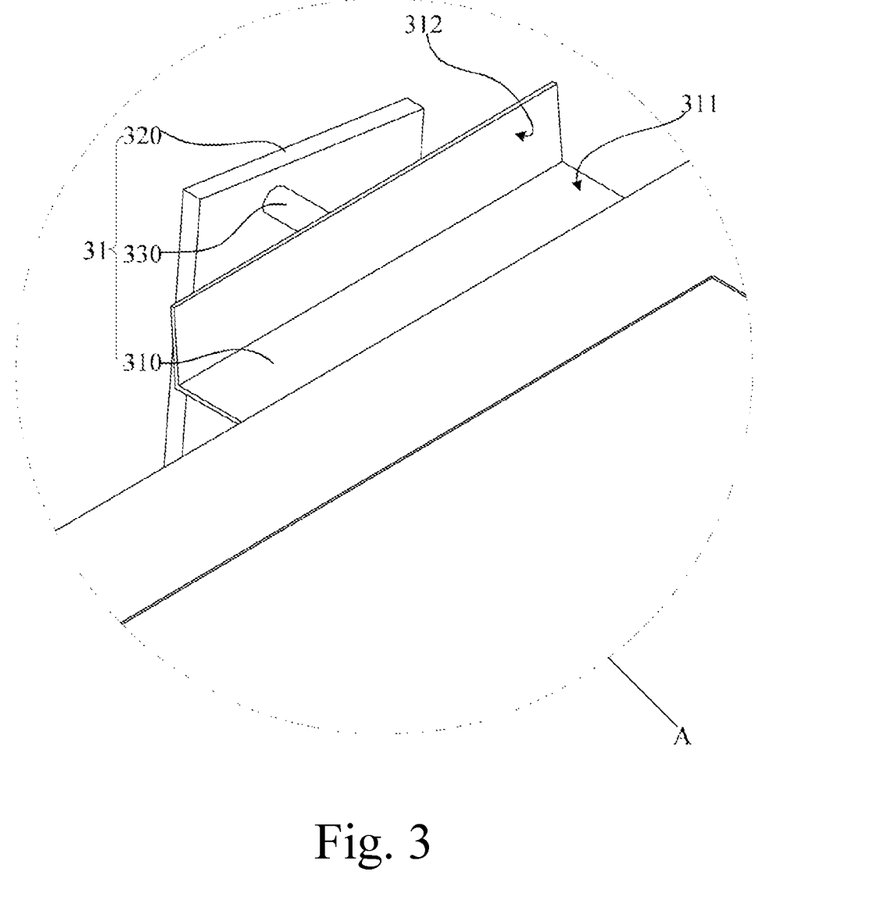
FIG. 3 is a partial enlarged view at A in FIG. 2.

An embodiment of the application further provides a full lamination apparatus for a display screen, and in the embodiment, as shown in FIGS. 1 to 3, the full lamination apparatus for a display screen comprises:

a chassis 1;

an affixing platform 2 fixed relative to the chassis, the affixing platform 2 having a table top arranged upward and used for the first layer body 201 to be placed flat on; and a lifting support mechanism 3 mounted on the chassis 1, the lifting support mechanism 3 having a support frame 31 which can be lifted and lowered, the support frame 31 supporting the second layer body 202 upward, and a controller for controlling, by controlling the lifting support mechanism 3, the second layer body 202 to swing in a direction approaching the first layer body 201 according to a speed curve gradually reducing over time, so that the second layer body 202 is affixed to the first layer body 201 at a preset speed. In particular, the controller is used in operation to implement step 160 of the above embodiment by controlling the lifting support mechanism 3. The controller is a control device commonly used in the art such as a computer.

In this embodiment, the chassis 1 is used to serve as a base support, and other components of the full lamination apparatus are fixed or positioned based on the chassis 1. The chassis 1 may be either of a simple frame structure or of a housing or casing structure.

In an in-use state, the affixing platform 2 is directly or indirectly fixed to the chassis 1. In some embodiments, the chassis 1 and the affixing platform 2 may also be of an integral structure. The table top of the affixing platform 2 is used for supporting the first layer body 201. The table top is generally arranged upward, so that the components of the display screen, such as the first layer body 201, can be placed steadily even by gravity only. In some embodiment, that table top may also be arranged at an inclined or horizontal orientation. In addition to supporting the first layer body 201, in particular, in some processes, the affixing platform 2 is also used to fix the first layer body 201, for example, by a fastener, vacuum or magnetic attraction.

The lifting and lowering of the support frame 31 has a gradual feature to ensure that the second layer body 202 can be affixed to the first layer body 201 accurately by smoothly lifting. The gradual lifting and lowering can be realized by various existing means, such as a linear feed motor, a screw-thread fitted lead screw slider, a gear rack engaged with gear-hobbing, and the like. In combination with the gradual lifting means, it can be appreciated that the lifting and lowering of the support frame 31 can be either automatic by electric control or semi-automatic by hand, for example, lifting or lowering the support frame 31 gradually in a hand-cranking manner.

The support frame 31 may support the second layer body 202 either in a manner of holding up or in a manner of pulling upward, for example, absorbing a top surface of the second layer body 202 by a vacuum chuck.

Since the table top is arranged upward, the second layer body 202 can be affixed to the first layer body 201 with the action of gravity in combination with the lifting and lowering of the support frame 31. It can be appreciated that such affixing effect may also be further ensured by an auxiliary process or mechanism, for example, applying roller pressing to the back surface of the second layer body 202. If the table top is arranged horizontally, an auxiliary process or mechanism is required to ensure the affixing between the second layer body 202 and the first layer body 201.

The beneficial effect of the application is that, by providing the lifting support mechanism 3 to support the second layer body 202 on the upper side of the display screen first layer body 201, and during the affixing, adjusting the height of the second layer body 202 gradually and controlling the second layer body to swing toward the first layer body from an inclined position according to a speed curve gradually reducing over time, it is possible to ensure the lateral uniformity of affixing angle for the second layer body which is affixed continuously every moment in the lateral direction. On the other hand, in the affixing direction, the second layer body is affixed to the first layer body at a preset speed, that is, the affixed area per unit time is relatively uniform, so that the generation of bubbles is reduced and the yield of affixing is ensured.

Further, the support frame 31 comprises a support block 310 having an upward support surface 311 for abutting against the bottom surface of the second layer body 202.

In this embodiment, it is only necessary to ensure the strength of the support block 310 by providing the support surface 311 arranged upward without any other force application mechanisms, such as a vacuum pumping apparatus and the like, so that the structure is simple.

Further, the support block 310 further has a first positioning surface 312 facing a center of the second layer body 202, which is used to abut against an edge of the second layer body 202.

In this embodiment, the abutment between the second layer body 202 and the first layer body 201 can be ensured by the first positioning surface 312 abutting against the edge of the second layer body 202. Alternatively, the support block 310 may be movably arranged in a direction perpendicular to that in which the second layer 202 is affixed and fed, so that the support block 310 may accommodate the second layer body 202 with different widths. The affixing feed direction refers to the feed direction of the affixing line between the second layer body 202 and the first layer body 201. For example, the affixing feed direction in FIG. 2 is the direction extending from the left end to the right end parallel to the table top of the affixing platform 2.

Further, the support frame 31 further comprises a base 320 extending from bottom to top and a cross bar 330 extending from an upper end of the base 320 towards the center of the second layer body 202. The support block 310 is pivotally connected to an end of the cross bar 330 away from the base 320, with a pivot axis of the support block 310 perpendicular to the affixing feed direction of the second layer body 202.

In this embodiment, since the support block 310 is pivotally connected to the cross bar 330, the support block 310 will be rotated gradually relative to the cross bar 330 during lowering of the second layer body 202, thereby ensuring that the support surface 311 is always in surface contact with the bottom surface of the second layer body 202, so as to improve the smoothness of supporting.

Figure 5:
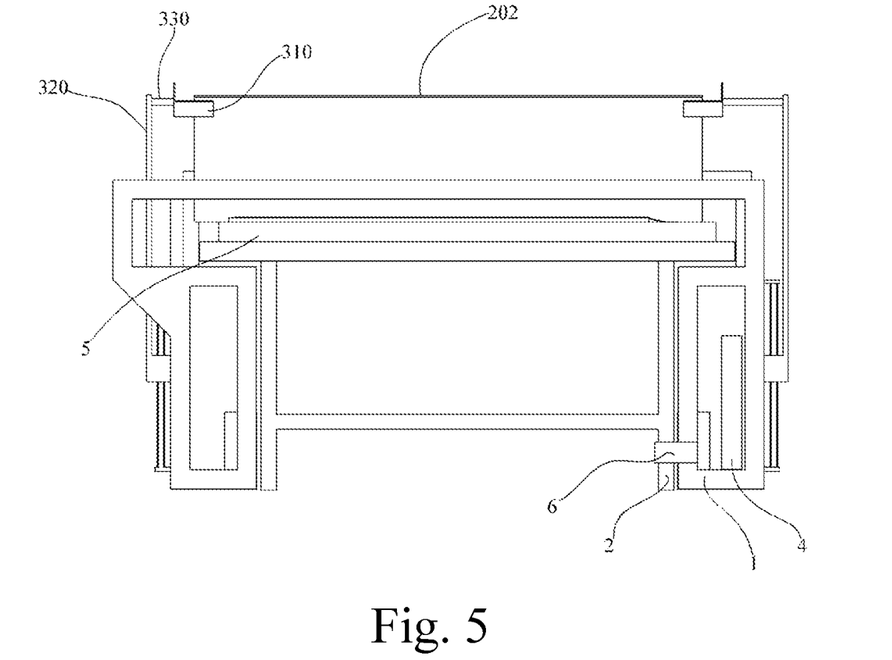
FIG. 5 is a right side view of the full lamination apparatus for a display screen of FIG. 4.
Figure 6:
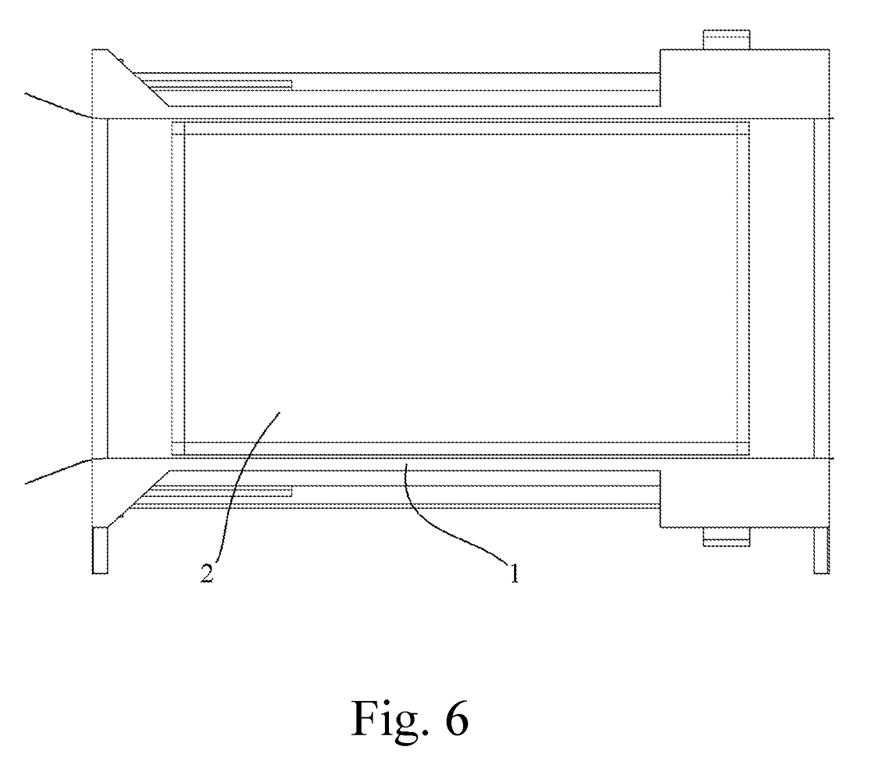
FIG. 6 is a bottom view of the full lamination apparatus for a display screen of FIG. 4.

Further, referring to FIG. 5, the lifting support mechanism 3 further comprises a drive device, and the full lamination apparatus further comprises a control box 4 electrically connected to the drive device to control the lifting and lowering of the support frame 31.

In this embodiment, the control box 4 can electrically control the drive device so as to realize the automation of the lifting and lowering as well as the improvement of the movement accuracy of lifting, and thus to better adapt to the affixing process between the second layer body 202 and the first layer body 201. It will be appreciated that the drive device may be a separate motor or a combination of a motor and a transmission. In particular, the drive device may comprise a plurality of lead screws 321 arranged parallelly, three of them are shown in FIG. 2, and the base 320 of the support frame 31 is provided with three threaded holes accordingly. The motor is used for driving the lead screws 321 to rotate, so as to lift or lower the support frame 31.

Further, the table top has a first axis extending in the affixing feed direction of the second layer body 202 and passing through the center of the table top. There are provided with at least two lifting support mechanisms 3, both of which are located at a periphery of the table top and at opposite sides of the first axis respectively.

In this embodiment, the lifting support mechanisms 3 are arranged on both sides of the second layer body 202, which is advantageous for more balanced lifting or lowering of the first layer body 202. Taking that shown in FIG. 2 as an example, the second layer body 202 is rectangular and has two long sides and two short sides, and the two lifting support mechanisms 3 are located outside the long sides respectively. In some embodiment, it is also possible to provide only one lifting support mechanism 3 located outside the short side, or it is also possible to provide three lifting support mechanisms 3, in addition to the two located outside the two long sides, the other lifting support mechanism 3 of which is arranged outside the short side. It can be appreciated that a horizontal distance of the two long sides of the second layer body 202 with respect to the outer contour of the chassis 1 does not change during the lifting and lowering of the first layer body 202, so that there is no need for the support frame 31 to be adjusted in the horizontal direction and the structure is simpler and more practical.

Optionally, the full lamination apparatus for the display screen further comprises a positioning means 5 fixed on the chassis 1, which has a second positioning surface facing the center of the table top. At the beginning of affixing, the second positioning surface abuts against an end of the first layer body 201 superimposed on the second layer body 202 in the affixing feed direction of the second layer body 202.

In this embodiment, the positioning means 5 can position the second layer body 202 at the beginning of affixing to prevent the positioning between the second layer body 202 and the first layer body 201 from deviating in the preset direction of affixing, and prevent the second layer body 202 from swinging to a certain extent.

Further, the table top has a first axis extending in the affixing feed direction of the second layer body 202 and passing through the center of the table top. The second layer body has a second axis, a projection of which on the table top is perpendicular to the first axis.

There are provided with at least two lifting support mechanisms 3, which are located at a periphery of the table top and at both sides of the first axis respectively.

The support frame 310 of each lifting support mechanism 31 comprises a support block 310 having a first positioning surface 312 facing the center of the second layer body 202, which is used to abut against a side surface of the second layer body 202. The first positioning surfaces 312 of the two support blocks 310 are arranged opposite in the extending direction of the second axis (at both sides of the first axis).

In this embodiment, in combination with the positioning of the first positioning surface 312 and further by the respective second positioning surfaces of both the lifting support mechanisms 3 forming a clamping positioning structure, a three-surface positioning structure is formed, so that the alignment between the second layer body 202 and the first layer body 201 is more accurate, and thus the accuracy of affixing is improved.

Figure 4:
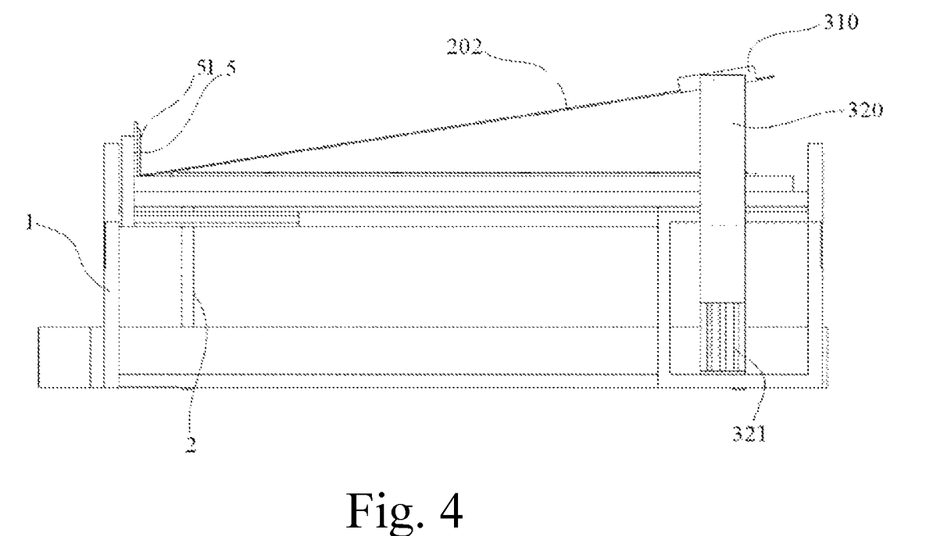
FIG. 4 is a front view of the full lamination apparatus for a display screen of FIG. 2.

Further, referring to FIGS. 2, 4 and 5, the affixing platform 2 and the chassis 1 are horizontally detachably fixed.

In this embodiment, after the affixing platform 2 is horizontally detached from the chassis 1, a larger operation space can be obtained. For example, both the placement of the first layer body 201 and the coating of glue on the first layer body 201 may be implemented in a state where the affixing platform 2 is horizontally detached from the chassis 1. After these processes are completed, the affixing platform 2 is pushed into the chassis 1, and the affixing platform 2 is fixed to the chassis 1 to perform the affixing operation of the second layer body 202.

Further, the full lamination apparatus for the display screen further comprises an automatic fixing clip 6 for automatically locking and fixing the affixing platform 2 when the affixing platform 2 moves to the preset position of the chassis 1.

In this embodiment, the connection efficiency between various procedures of the affixing process is improved by providing the automatic fixing clip 6 to fix the affixing platform 2, and thereby the production efficiency of affixing is improved. The automatic fixing clip 6 may employ any existing means such as a pneumatic, electromagnetic, hydraulically driven articulated arm or the like.

It should be appreciated that the above embodiments are only used to illustrate the technical solutions of the application, but not to limit the same. It is possible for a person skilled in the art to modify the technical solutions described in the above embodiments or equivalently replace some of the technical features thereof. All the modifications and substitutions shall fall within the protection scope of the claims appended to the application.

What is claimed is:

1. A full lamination method for a display screen, comprises:
   arranging a first layer body horizontally;
   coating liquid glue on an upper surface of the first layer body;
   placing a second layer body over the first layer body at a preset inclination with an end of the second layer body contacting with an initially affixed end of the first layer body;
   controlling a second end of the second layer body opposite to the first end to swing in a direction approaching the first layer body according to a speed curve gradually reducing over time, so that the second layer body is affixed to the first layer body at a preset speed;
   wherein the preset inclination is $\alpha_0$, an initial angular speed of swing is $\omega_0$, an overall affixed length of the second layer body is L, the preset speed is Vt, and they satisfy the following relational expression:

$\alpha_0 \geq 9°$;

$0.3°/s \leq \omega_0 \leq 0.4°/s$;

$Vt \in [V-V*5\%, V+V*5\%]$, wherein $V$ is a reference speed and satisfies:

$$V = \frac{\omega_0}{\alpha_0} L.$$

2. The full lamination method according to claim 1, wherein the speed curve reduces in a step-like manner.

3. The full lamination method according to claim 2, wherein
   the speed curve comprises three speed stages, the initial speeds of which are $V_1$, $V_2$ and $V_3$ in sequence, where $V_1=0.3°/s$, $V_2=0.15°/s$ and $V_3=0.1°/s$; and
   the second layer body is swung from 9° to 5° at $V_1$, from 5° to 2° at $V_2$, and then from 2° to 0° at $V_3$.

4. The full lamination method according to claim 1, wherein the reference speed is V=30 mm/s.

5. A full lamination apparatus for a display screen, the display screen comprising a first layer body and a second layer body (202) affixed viscidly to the first layer body (201), wherein the full lamination apparatus for a display screen comprises:
   a chassis (1);
   an affixing platform (2) fixed relative to the chassis, the affixing platform having a table top arranged upward and used for the first layer body to be placed flat on;
   a lifting support mechanism (3) mounted on the chassis, the lifting support mechanism having a support frame (31) which can be lifted and lowered, the support frame supporting the second layer body (202) upward, so that the second layer body (202) is placed over the first layer body at a preset inclination with an end of the second layer body (202) contacting with an initially affixed end of the first layer body; and
   a controller for controlling, by controlling the lifting support mechanism, the second layer body to swing in a direction approaching the first layer body according to a speed curve gradually reducing over time, so that the second layer body is affixed to the first layer body at a preset speed,
   wherein the preset inclination is $\alpha_0$, an initial angular speed of swing is $\omega_0$, an overall affixed length of the second layer body (202) is L, the preset speed is Vt, and they satisfy the following relational expression:

$\alpha_0 \geq 9°$;

$0.3°/s \leq \omega_0 \leq 0.4°/s$;

$Vt \in [V-V*5\%, V+V*5\%]$, wherein $V$ is a reference speed and satisfies:

$$V = \frac{\omega_0}{\alpha_0} L.$$

6. The full lamination apparatus for a display screen according to claim 5, wherein
   the support frame (31) comprises a support block (310) having an upward support surface (311) for abutting against the bottom surface of the second layer body (202);
   the support block (310) further has a first positioning surface (312) facing in the direction of the second layer body, which is used to abut against a side edge of the second layer body (202).

7. The full lamination apparatus for a display screen according to claim 6, wherein
   the support frame (31) further comprises a base (320) extending from bottom to top and a cross bar (330) extending from an upper end of the base in the direction towards the second layer body;
   the support block (310) is pivotally connected to an end of the cross bar (330) away from the base, with a pivot axis of the support block perpendicular to an affixing feed direction of the second layer body.

8. The full lamination apparatus for a display screen according to claim 7, wherein the lifting support mechanism (3) further comprises a drive device, the full lamination apparatus further comprising a control box (4), which is electrically connected to the drive device in order to control the support frame (31) to move up and down.

9. The full lamination apparatus for a display screen according to claim 6, wherein
   the table top has a first axis extending in the affixing feed direction of the second layer body (202) and passing through a center of the table top;
   there are provided with at least two lifting support mechanisms (3), both of which are located at a periphery of the table top and at opposite sides of the first axis respectively.

10. The full lamination apparatus for a display screen according to claim 5, wherein the apparatus further comprises a positioning means (5) fixed to the chassis, the positioning means being located at an end of the affixing platform and having a second positioning surface (51) facing in the direction of the table top, the second positioning surface abutting against an end of the first layer body (201) superimposed on the second layer body (202) in the affixing feed direction of the second layer body.

11. The full lamination apparatus for a display screen according to claim 10, wherein
   the table top has a first axis extending in the affixing feed direction of the second layer body and passing through a center of the table top;
   there are provided with at least two lifting support mechanisms (3), both of which are located at a periphery of the table top and at opposite sides of the first axis respectively;
   the support frame (31) of each of the lifting support mechanisms comprises a support block (310) having a first positioning surface (312) facing in the direction of the second layer body (202), which is used for abutting against a side edge of the second layer body, the first positioning surfaces (312) of the two supporting blocks (310) being arranged opposite to each other on opposite sides of the first axis.

12. The full lamination apparatus for a display screen according to claim 5, wherein the affixing platform (2) is detachably fixed to the chassis (1) in a horizontal direction.

* * * * *